United States Patent
Chang et al.

(10) Patent No.: US 12,189,251 B2
(45) Date of Patent: Jan. 7, 2025

(54) SIGNAL CONTROL METHOD, CONTROLLER CHIP AND TOUCH SCREEN

(71) Applicant: AUO Corporation, Hsin-Chu (TW)

(72) Inventors: Shih-Hsi Chang, Hsin-Chu (TW); Yu-Hsin Ting, Hsin-Chu (TW); Chung-Lin Fu, Hsin-Chu (TW); I-Fang Chen, Hsin-Chu (TW); Wei-Chun Hsu, Hsin-Chu (TW); Nan-Ying Lin, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 135 days.

(21) Appl. No.: 17/993,214

(22) Filed: Nov. 23, 2022

(65) Prior Publication Data
US 2024/0027858 A1 Jan. 25, 2024

(30) Foreign Application Priority Data
Jul. 21, 2022 (TW) ................................. 111127401

(51) Int. Cl.
*G02F 1/1362* (2006.01)
*G02F 1/1333* (2006.01)
(Continued)

(52) U.S. Cl.
CPC .... *G02F 1/136286* (2013.01); *G02F 1/13338* (2013.01); *G06F 3/0412* (2013.01);
(Continued)

(58) Field of Classification Search
CPC ............. G09G 3/18; G09G 2300/0413; G09G 2310/0251; G09G 2310/0297; G09G 3/36;
(Continued)

(56) References Cited

U.S. PATENT DOCUMENTS 9,851,840 B2 * 12/2017 Hwang ................... G06F 3/016
2014/0132534 A1 * 5/2014 Kim ....................... G06F 3/0416
345/173

(Continued)

FOREIGN PATENT DOCUMENTS

CN 103793118 A * 5/2014 ............. G06F 3/044
CN 113053952 A * 6/2021 ............. G09F 9/301
(Continued)

*Primary Examiner* — Ricardo Osorio
(74) *Attorney, Agent, or Firm* — WPAT, PC (57) ABSTRACT

A signal control method suitable for a touch screen is provided. The signal control method comprises: switching a plurality of scan lines to an enabling voltage level sequentially in a display stage; turning on a plurality of switches sequentially to transmit a plurality of display data to a plurality of data lines when a first scan line of the plurality of scan lines is in an enabled voltage level, wherein a first switch of the plurality of switches is coupled to a first data line of the plurality of data lines, and the first data line corresponds to one of a plurality of dummy lines in a vertical direction, when the first scan line is in the enabled voltage level, the first switch is turned on after other switches are turned on; and setting the plurality of dummy lines to a touch voltage in a touch stage.

16 Claims, 4 Drawing Sheets

(51) Int. Cl.
*G06F 3/041* (2006.01)
*G06F 3/044* (2006.01)
*G09G 3/18* (2006.01)

(52) U.S. Cl.
CPC ...... *G06F 3/04164* (2019.05); *G06F 3/04166* (2019.05); *G06F 3/0446* (2019.05); *G09G 3/18* (2013.01); *G09G 2300/0413* (2013.01); *G09G 2310/0251* (2013.01)

(58) Field of Classification Search
CPC ....... G09G 2310/02; G09G 2310/0243; G09G 2310/0264; G09G 2320/0233; G09G 2320/0626; G02F 1/136286; G02F 1/13338; G02F 1/1343; G02F 1/1345; G02F 1/1362; G06F 3/0412; G06F 3/04164; G06F 3/04166; G06F 3/0446; G06F 3/04184; G06F 3/0416; G06F 3/044
See application file for complete search history.

(56) References Cited

U.S. PATENT DOCUMENTS

| | | | |
|---|---|---|---|
| 2015/0268796 A1* | 9/2015 | Tsuyuzaki | G06F 3/0445 |
| | | | 345/174 |
| 2017/0269446 A1* | 9/2017 | Sang | G02F 1/13338 |
| 2018/0329547 A1 | 11/2018 | Wu | |
| 2019/0279595 A1* | 9/2019 | Jang | G09G 5/391 |
| 2019/0391705 A1* | 12/2019 | Saai | G06F 3/0446 |
| 2021/0349600 A1 | 11/2021 | Chen | |
| 2021/0349601 A1 | 11/2021 | Chen | |
| 2022/0326834 A1 | 10/2022 | Chen | |
| 2023/0238393 A1* | 7/2023 | Katsuta | G06F 3/0412 |
| 2023/0418401 A1* | 12/2023 | Han | G06F 3/0412 |

FOREIGN PATENT DOCUMENTS

| | | | | |
|---|---|---|---|---|
| DE | 112016001033 T5 | * | 12/2017 | ........ G02F 1/1368 |
| KR | 20080098876 A | * | 11/2008 | |
| TW | 201712498 A | * | 4/2017 | ........ G06F 3/0412 |
| TW | 201907274 A | | 2/2019 | |
| WO | WO-2010095293 A1 | * | 8/2010 | ........ G02F 1/13338 |

* cited by examiner

SIGNAL CONTROL METHOD, CONTROLLER CHIP AND TOUCH SCREEN

RELATED APPLICATIONS

This application claims priority to Taiwan Application Serial Number 111127401, filed on Jul. 21, 2022, which is herein incorporated by reference in its entirety.

BACKGROUND

Field of Invention

The disclosure is related to a touch screen technology. More particularly, the disclosure is related to a signal control method, a controller chip and a touch screen.

Description of Related Art

With the development of display technology, the display device has become a part of modern people's life, thus the convenience of operation and the variety of functions of the display device have become one of the focuses of the development of display technology. Touch screens are widely used in various electronic products nowadays due to their intuitive and convenient operation.

However, in a touch screen, since the display circuit and the touch circuit overlap each other in a vertical direction, when the touch screen is displaying, some data lines in the display circuit may be coupled with the touch circuit, resulting in uneven brightness of the screen. Therefore, how to solve the problem of uneven brightness of the touch screen is one of the issues in the art.

SUMMARY

A signal control method suitable for a touch screen is provided in present disclosure. The touch screen comprises a plurality of scan lines, a plurality of data lines, a demultiplexer, a controller chip and a plurality of dummy lines, wherein the plurality of dummy lines are located above the plurality of data lines, and the demultiplexer comprises a plurality of switches coupled to the plurality of data lines. The signal control method comprises: switching the plurality of scan lines to an enabled voltage level sequentially in a display stage; turning on the plurality of switches sequentially to transmit a plurality of display data to the plurality of data lines when a first scan line of the plurality of scan lines is in the enabled voltage level, wherein a first switch of the plurality of switches is coupled to a first data line of the plurality of data lines, and the first data line corresponds to one of the plurality of dummy lines in a vertical direction, when the first scan line is in the enabled voltage level, the first switch is turned on after others of the plurality of switches are turned on; and setting the plurality of dummy lines to a touch voltage in a touch stage.

A controller chip is provided in present disclosure. The controller chip is configured to be arranged in a touch screen comprising a plurality of scan lines, a plurality of data lines, a demultiplexer and a plurality of dummy lines, wherein the plurality of dummy lines are located above the plurality of data lines, and the demultiplexer comprises a plurality of switches coupled to the plurality of data lines. Moreover, the controller chip is configured to: switch the plurality of scan lines to an enabled voltage level sequentially in a display stage; turn on the plurality of switches sequentially to transmit a plurality of display data to the plurality of data lines when a first scan line of the plurality of scan lines is in the enabled voltage level, wherein a first switch of the plurality of switches is coupled to a first data line of the plurality of data lines, and the first data line corresponds to one of the plurality of dummy lines in a vertical direction, when the first scan line is in the enabled voltage level, the first switch is turned on after others of the plurality of switches are turned on; and set the plurality of dummy lines to a touch voltage in a touch stage.

A touch screen is provided in present disclosure. The touch screen comprises a plurality of scan lines, a demultiplexer, a plurality of data lines, a plurality of dummy lines and a controller chip, wherein the demultiplexer comprises a plurality of switches, the plurality of data lines are coupled to the plurality of switches, a first switch of the plurality of switches is coupled to a first data line of the plurality of data lines, the plurality of dummy lines are located above the plurality of data lines, the first data line corresponds to one of the plurality of dummy lines in a vertical direction, and the controller chip is coupled to the plurality of scan lines, the demultiplexer and the plurality of dummy lines. The controller chip is configured to: switch the plurality of scan lines to an enabled voltage level sequentially in a display stage; turn on the plurality of switches sequentially to transmit a plurality of display data to the plurality of data lines when a first scan line of the plurality of scan lines is in the enabled voltage level, wherein when the first scan line is in the enabled voltage level, the first switch is turned on after others of the plurality of switches are turned on; and set the plurality of dummy lines to a touch voltage in a touch stage.

It should be understood that both the foregoing general description and the following detailed description are by examples, and are intended to provide further explanation of the disclosure as claimed.

DETAILED DESCRIPTION

The term "coupled" or "connected" used throughout the present disclosure may refer to two or more elements physically or electrically contact with each other in direct, or physically or electrically contact with each other in indirect, or two or more elements interact or act on each other. In addition, although terms such as "first", "second", etc. are used in the present disclosure to describe different elements, these terms are only used to distinguish elements or operations described by the same technical terms. Unless clearly indicated, the terms do not specifically refer to or imply a sequence or an order, nor are they intended to limit the present disclosure.

Reference will now be made in detail to the present embodiments of the disclosure, examples of which are illustrated in the accompanying drawings.

Figure 1:
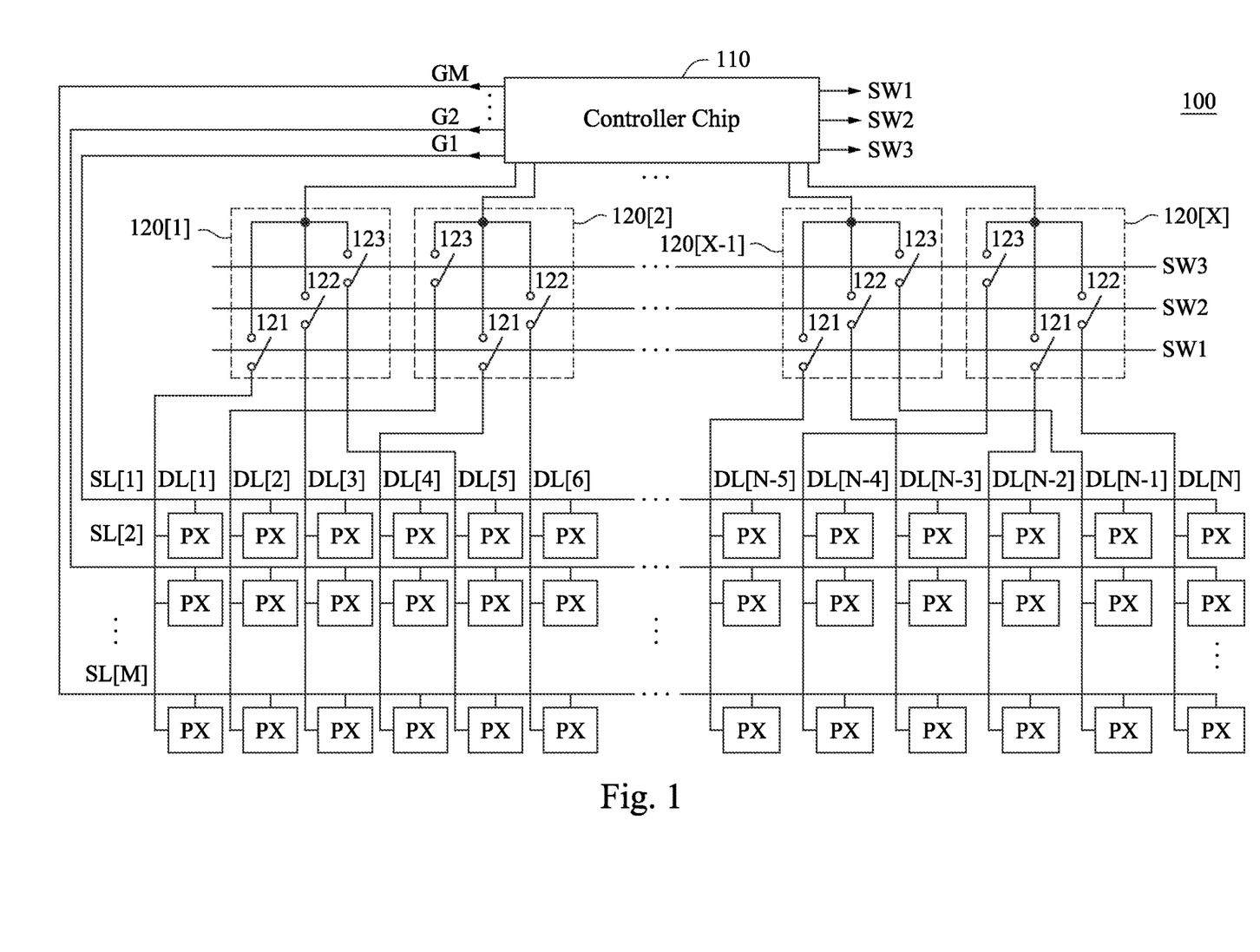
FIG. 1 is a simplified block diagram of a pixel circuit matrix and related control circuits of a touch screen in accordance with some embodiments of the present disclosure.
Figure 2:
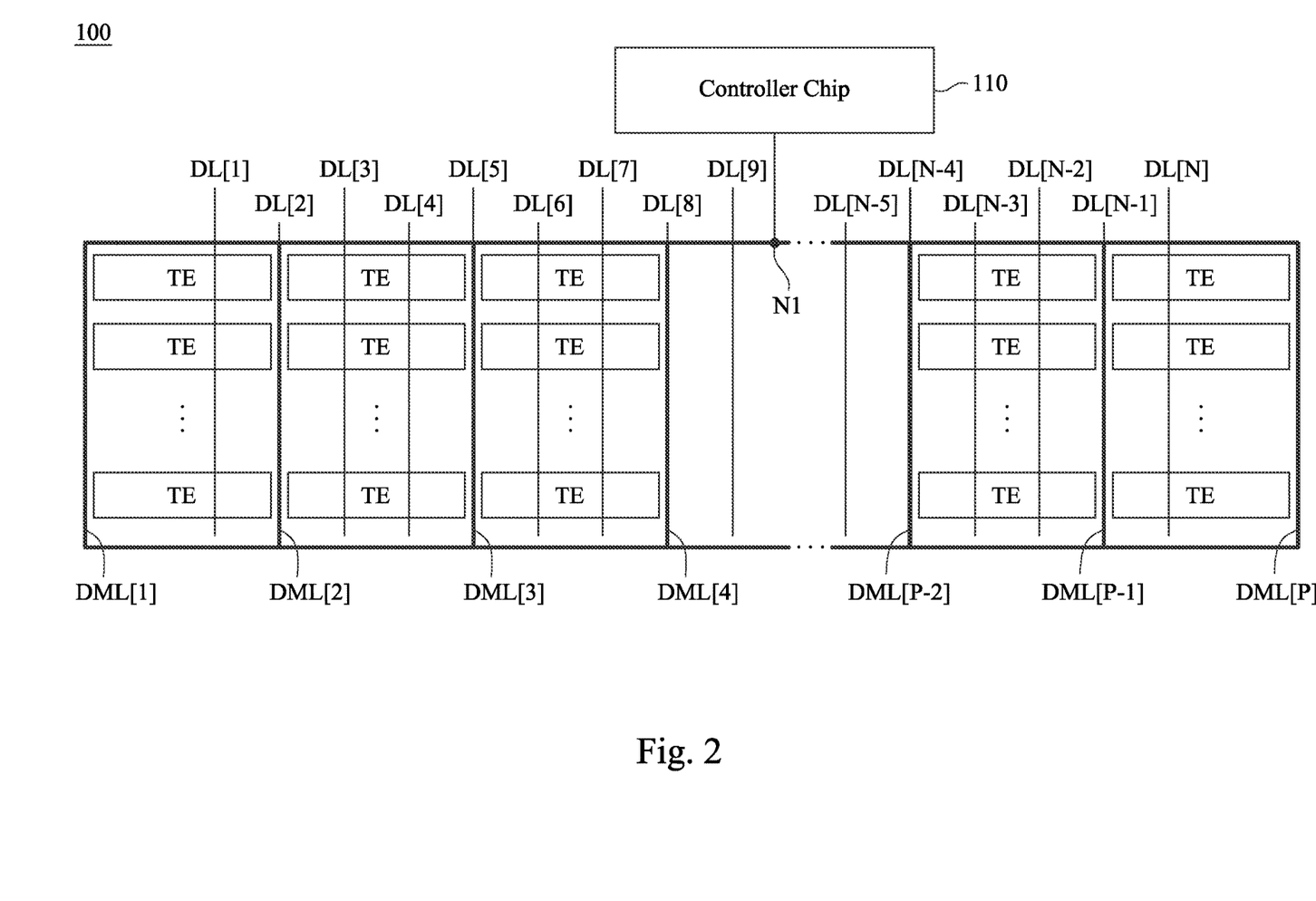
FIG. 2 is a simplified block diagram of a touch electrode matrix and related control circuits of the touch screen in accordance with some embodiments of the present disclosure.

Since some components of the touch screen 100 of the present disclosure overlap each other in a vertical direction, in order to clearly describe the structure of the touch screen 100, please refer to FIG. 1 and FIG. 2 together. FIG. 1 is a simplified block diagram of a pixel circuit matrix and related control circuits of the touch screen 100 in accordance with some embodiments of the present disclosure. FIG. 2 is a simplified block diagram of a touch electrode matrix and related control circuits of the touch screen 100 in accordance with some embodiments of the present disclosure. In some embodiments, the touch screen 100 comprises a plurality of scan lines SL[1]-SL[M], a controller chip 110, a plurality of demultiplexers 120[1]-120[X], a plurality of data lines DL[1]-DL[N] and a plurality of dummy lines DML[1]-DML[P]. The controller chip 110 is coupled to scan lines SL[1]-SL[M], demultiplexers 120[1]-120[X] and dummy lines DML[1]-DML[P], wherein X, M and N are positive integers, and P is a positive integer less than or equal to N.

The dummy lines DML[1]-DML[P] are located above the data lines DL[1]-DL[N]. Reference in the present disclosure to a component being "above" another component means that the component is formed (e.g., vapor-deposited) sequentially after the other component on a substrate. In other words, on the substrate, the formation order of the metal layer where the dummy lines DML[1]-DML[P] are located is after the metal layer where the data lines DL[1]-DL[N] are located.

In some embodiments, the controller chip 110 may be implemented with a touch and display driver integration (TDDI) chip.

In some embodiments, as shown in FIG. 1, the touch screen 100 further includes a plurality of pixel circuits PX. The pixel circuits PX are arranged into M pixel rows coupled to the scan lines SL[1]-SL[M] and N pixel columns coupled to the data lines DL[1]-DL[N].

The demultiplexers 120[1]-120[X] each includes a plurality of switches 121-123, wherein the switches 121-123 are respectively coupled to parts of the data lines DL[1]-DL[N]. Take the demultiplexer 120[1] as an example, the switch 121 is coupled to the data line DL[1], the switch 122 is coupled to the data line DL[3], and the switch 123 is coupled to the data line DL[5].

It should be noted that the quantity of the switches 121-123 in each of the demultiplexers 120[1]-120[X] and the connection relationship between the switches 121-123 and the data lines DL[1]-DL[N] in FIG. 1 are only an example, and are not intended to limit the present disclosure. The other quantity of the switches and the other connection relationship between the switches and the data lines DL[1]-DL[N] are within the scope of the present disclosure.

In some embodiments, as shown in FIG. 2, the first ends of the dummy lines DML[1]-DML[P] are coupled to each other, the second ends of the dummy lines DML[1]-DML[P] are coupled to a node N1, and the node N1 is coupled to the controller chip 110. In other embodiments, the first ends of the dummy lines DML[1]-DML[P] are coupled to each other, but the second ends of the dummy lines DML[1]-DML[P] are respectively coupled to a plurality of pins (not shown in FIG. 2) of the controller chip 110 instead of being coupled to each other.

In some embodiments, as shown in FIG. 2, the touch screen 100 further includes a plurality of touch electrodes TE. The touch electrodes TE are arranged in P touch electrode columns, and the P touch electrode columns and the dummy lines DML[1]-DML[P] are alternately arranged in a way that one touch electrode column and one dummy line alternate with each other.

Please refer to FIG. 1 and FIG. 2 together. For each demultiplexer, the data line coupled to one of the switches 121-123 corresponds to one of the dummy lines DML[1]-DML[P] in the vertical direction. For example, as shown in FIG. 2, the data line DL[5] coupled to the switch 123 of the demultiplexer 120[1] corresponds to the dummy line DML[3] in the vertical direction. For another example, as shown in FIG. 2, the data line DL[2] coupled to the switch 123 of the demultiplexer 120[2] corresponds to the dummy line DML[2] in the vertical direction, and so on.

In some embodiments, "corresponding to each other in the vertical direction" means that a dummy line and its corresponding data line are located between two adjacent ones of the N pixel columns. For example, the dummy line DML[3] and the data line DL[5] are located between the fourth pixel column and the fifth pixel column (i.e., between the fourth column and the fifth column of the pixel circuit PX). In other embodiments, "corresponding to each other in the vertical direction" means that a vertical projection on a substrate (not shown) of a dummy line of the touch screen 100 at least partially overlaps a vertical projection on the substrate of a data line corresponding to the dummy line.

In practice, the controller chip 110 is configured to perform various operations in a display stage and a touch stage. In the display stage, the controller chip 110 is configured to transmit switch signals SW1-SW3 to the demultiplexers 120[1]-120[X], so as to sequentially turn on the switches 121-123, and then transmit display data to the data lines DL[1]-DL[N]. For example, when the switch signal SW1 is changed from a disabled voltage level to an enabled voltage level, the switch 121 is turned on, so that the controller chip 110 can transmit the display data to the data lines DL[1], DL[4], . . . , DL[N−5] and DL[N−2]. In some embodiments, in the display stage, the controller chip 110 is configured to transmit scan signals G1-GM to the scan lines SL[1]-SL[M] respectively, so as to sequentially switch the scan lines SL[1]-SL[M] to the enabled voltage level or to the disabled voltage level. For example, in the display stage, when the scan signal G1 is changed from the disabled voltage level to the enabled voltage level, the scan line SL[1] will be switched from the disabled voltage level to the enabled voltage level to drive the pixel circuit PX to receive the display data from the data lines DL[1]-DL[N].

In addition, in the display stage, the controller chip 110 is further configured to transmit the common voltage VCOM to the dummy lines DML[1]-DML[P]. According to the common voltage VCOM and the display data, the pixel circuit PX can display specific brightness. For example, in some embodiments, the pixel circuit PX can be implemented with a liquid crystal pixel circuit, the dummy lines DML[1]-DML[P] can act as one side of the electrodes of the liquid crystal capacitor, and the another side of the electrodes of the liquid crystal capacitor is used to receive the display data.

In some embodiments, in the touch stage, the controller chip 110 is configured to set the dummy lines DML[1]-DML[P] to a touch voltage for touch sensing. The dummy lines DML[1]-DML[P] with the touch voltage are configured to prevent external magnetic field from interfering with the touch electrodes TE, prevent the touch electrodes TE of different columns from interfering with each other, and assist in detecting the lateral movement of the user's finger. In some embodiments, in the touch stage, the controller chip 110 is further configured to turn off the switches 121-123.

In practice, when the scan lines SL[1]-SL[M] are in the enabled voltage level, when the switch signals SW1-SW3 are changed from the enabled voltage level to the disabled voltage level, the data lines DL[1]-DL[N] will not receive the display data from the controller chip 110, but the capacitor of the pixel circuit PX is still electrically connected to the data line at this time. However, the voltage on the dummy lines at this time may have deviated from the common voltage VCOM due to the display data and are gradually recovering to the common voltage VCOM, thus the dummy lines will be coupled to the data lines corresponding to each other in the vertical direction, resulting in unstable voltage levels on the data lines, thereby affecting the brightness of the pixel circuit PX.

With the signal control method disclosed in the present disclosure, the coupling problem between the dummy lines and the data lines can be solved when the controller chip 110 transmits the scan signals G1-GM and the switch signals SW1-SW3 to the scan lines SL[1]-SL[M] and the switches 121-123 with specific timing. The timing relationship between the scan signals G1-GM and the switch signals SW1-SW3 will be described in detail in paragraphs below.

Figure 3A:
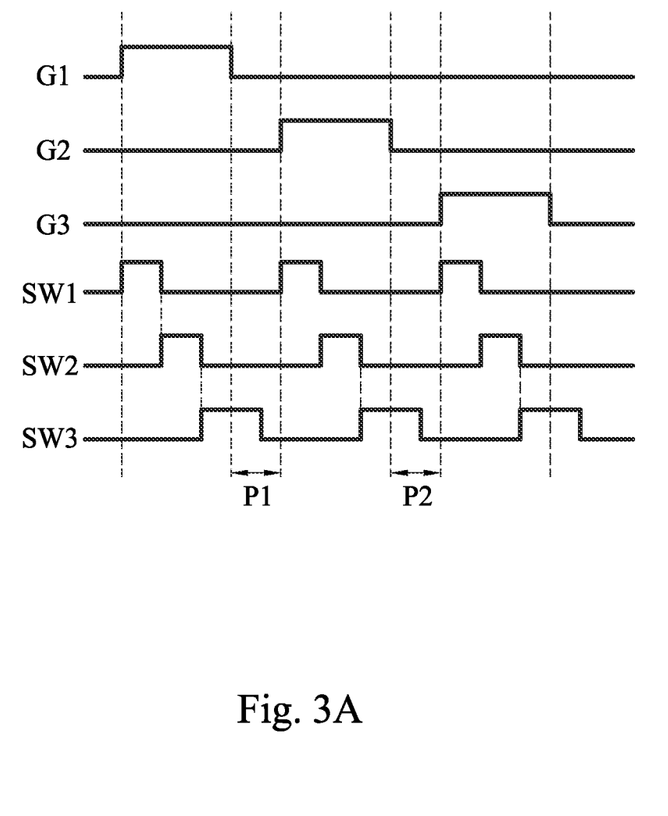
FIG. 3A is a timing diagram of scan signals and switch signals in accordance with some embodiments of the present disclosure.
Figure 3B:
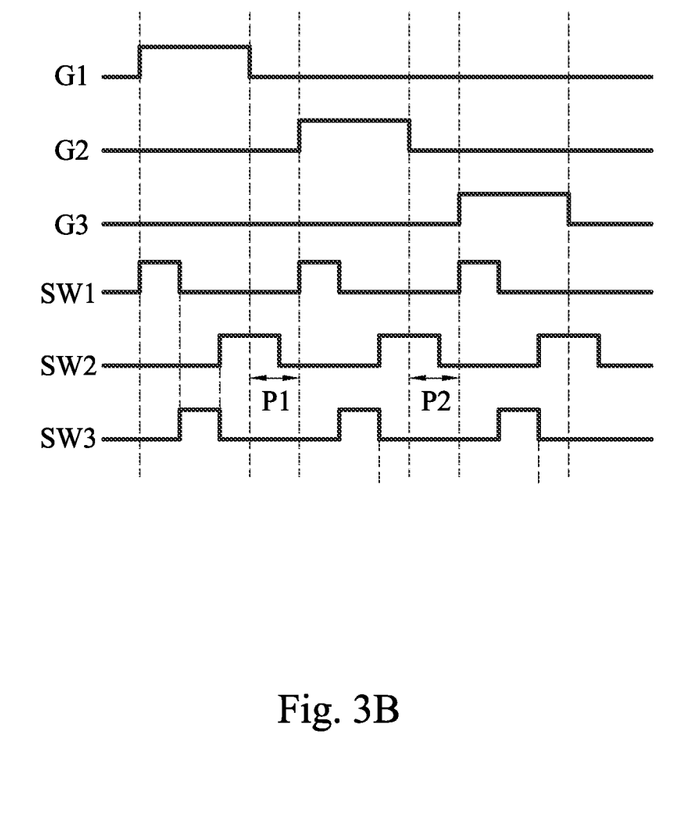
FIG. 3B is a timing diagram of scan signals and switch signals in accordance with some embodiments of the present disclosure.

FIG. 3A-3B are timing diagrams of scan signals G1-G3 and switch signals SW1-SW3 in accordance with some embodiments of the present disclosure. Please refer to FIG. 3A first, in some embodiments, the switch signals SW1-SW3 are sequentially switched to the enabled voltage level when the scan signals G1-G3 are in the enabled voltage level (i.e., the period when the scan lines SL[1]-SL[3] are in the enabled voltage level). For example, when the scan signal G1 is in the enabled voltage level (i.e., the scan line SL[1] is in the enabled voltage level), the switch signals SW1-SW3 are sequentially switched to the enabled voltage level, thus the switches 121-123 will turn on sequentially. Then, when the scan signal G2 is in the enabled voltage level (i.e., the scan line SL[2] is in the enabled voltage level), the switch signals SW1-SW3 are switched to the enabled voltage level in sequence again, thus the switches 121-123 will turn on again sequentially.

Since the switch signals SW1-SW3 have the same waveform when each of the scanning signals G1-GM is in the enabled voltage level, and the demultiplexers 120[1]-120[X] have similar operations, for the sake of brevity, the following only describes the timing relationship among the switch signals SW1-SW3, the scan signal G1 and the scan signal G2 with the demultiplexers 120[1], and the rest can be deduced by analogy.

In the embodiment shown in FIG. 3A, the data line coupled to each switch 123 corresponds to one of the dummy lines DML[1]-DML[P] in the vertical direction. For example, please refer to FIG. 2 again, the data line DL[2] coupled to the switch 123 of the demultiplexer 120[2] corresponds to the dummy line DML[2] in the vertical direction; the data line DL[5] coupled to the switch 123 of the demultiplexer 120[1] corresponds to the dummy line DML[3] in the vertical direction.

In the embodiment shown in FIG. 3A, when the scan line is in the enabled voltage level, the switch signal SW3 used to control the switch 123 is the last one of the switch signals SW1-SW3 to be switched to the enabled voltage level. In other words, in this embodiment, when the scan line is in the enabled voltage level, the switch 123 is turned on after the switches 121 and 122 are turned on.

In addition, in the embodiment shown in FIG. 3A, the pulse width of the switch signal SW3 is greater than or equal to the pulse width of the switch signals SW1 and SW2. For example, the switch signal SW3 remains at the enabled voltage level after the scan signal G1 is switched to the disabled voltage level, and is switched to the disabled voltage level before the scan signal G2 is switched to the enabled voltage level (i.e., the periods P1 and P2 indicated by double arrows). Therefore, the switch 123 is turned off after the scan line SL[1] is switched to the disabled voltage level and before the scan line SL[2] is switched to the enabled voltage level. In some embodiments, the switch signal SW3 is switched to the disabled voltage level when the scan signal G1 is switched to the disabled voltage level, thus the switch 123 is turned off when the scan line SL[1] is switched to the disabled voltage level.

By delaying the time at which the switch 123 is turned off, the data lines DL[2], DL[5], . . . , DL[N−4] and DL[N−1] coupled to the switch 123 can continue receiving display data from the controller chip 110 after the scan lines SL[1]-SL[M] are switched to the disabled voltage level, which prevents the change of the common voltage VCOM on the dummy lines DML[1]-DML[P] from affecting the pixel circuit PX through the data lines DL[2], DL[5], . . . , DL[N−4] and DL[N−1], thus the touch screen 100 can display with uniform brightness.

Please refer to FIG. 3B, in a certain touch screen (not shown) of the embodiment of FIG. 3B, each of the data lines coupled to the switches 122 corresponds to one of the dummy lines DML[1]-DML[P] in the vertical direction.

In the embodiment shown in FIG. 3B, when the scan line is in the enabled voltage level, the switch signal SW2 used to control the switch 122 is the last one of the switch signals SW1-SW3 to be switched to the enabled voltage level. In other words, in this embodiment, when the scan line is in the enabled voltage level, the switch 122 is turned on after the switches 121 and 123 are turned on.

In addition, in the embodiment shown in FIG. 3B, the pulse width of the switch signal SW2 is greater than or equal to the pulse width of the switch signals SW1 and SW3. For example, the switch signal SW2 remains at the enabled voltage level after the scan signal G1 is switched to the disabled voltage level, and is switched to the disabled voltage level before the scan signal G2 is switched to the enabled voltage level (i.e., the periods P1 and P2 indicated by double arrows). Therefore, the switch 122 is turned off after the scan line SL[1] is switched to the disabled voltage level and before the scan line SL[2] is switched to the enabled voltage level. In some embodiments, the switch signal SW2 is switched to the disabled voltage level when the scan signal G1 is switched to the disabled voltage level, thus the switch 122 is turned off when the scan line SL[1] is switched to the disabled voltage level.

In conclusion, by designating the switches coupled to the data lines corresponding to the dummy lines DML[1]-DML[P] in the vertical direction to be controlled by the same switch signal, and by designating this switch signal to be switched to the disabled voltage level later than the scan signal, the brightness of the pixel circuit PX can avoid being affected by the change of the common voltage VCOM on the dummy lines DML[1]-DML[P].

Figure 4:
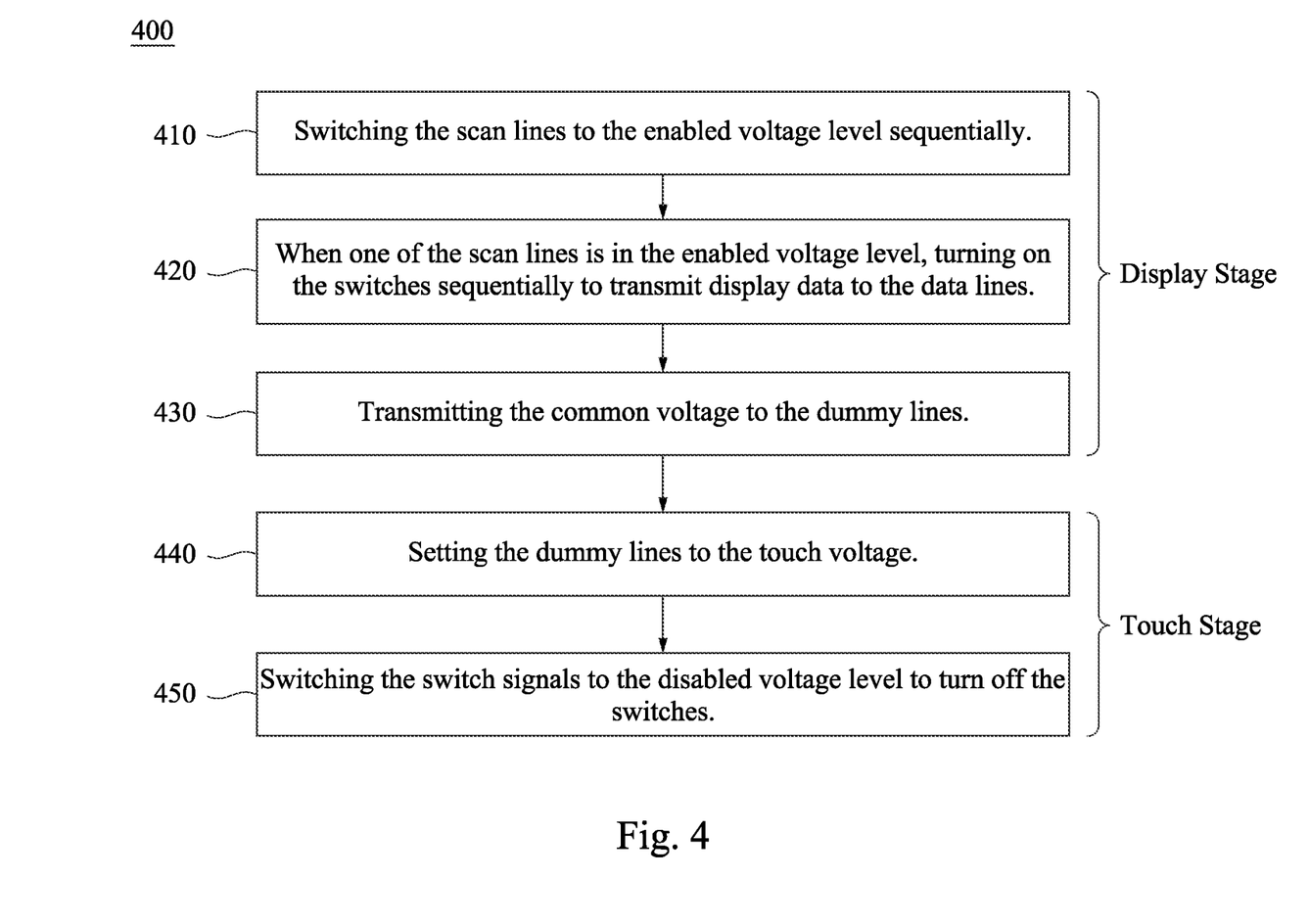
FIG. 4 is a flowchart of signal control method in accordance with some embodiments of the present disclosure.

FIG. 4 is a flowchart of signal control method 400 in accordance with some embodiments of the present disclosure. The signal control method 400 includes steps 410-430 of the display stage and steps 440-450 of the touch stage. In the step 410 of the display stage, the controller chip 110 sequentially switches the scan lines SL[1]-SL[M] to the enabled voltage level.

In the step 420 of the display stage, when one of the scan lines SL[1]-SL[M] (e.g., scan line G1) is in the enabled voltage level, the controller chip 110 sequentially turns on the switches 121-123 to transmit display data to the data lines DL[1]-DL[N], so as to control the brightness of the pixel circuit PX.

In the step 430 of the display stage, the controller chip 110 transmits the common voltage VCOM to the dummy lines DML[1]-DML[P] to control the brightness of the pixel circuit PX. In some embodiments, the switch 123 of the switches 121-123 is coupled to the data line DL[2], and the data line DL[2] corresponds to the dummy line DML[2] in the vertical direction. When the aforementioned scan line (e.g., the scan line G1) is in the enabled voltage level, the switch 123 is turned on after the switches 121-122 are turned on.

In the step 440 of the touch stage, the controller chip 110 sets the dummy lines DML[1]-DML[P] to the touch voltage for touch sensing.

In the step 450 of the touch stage, the controller chip 110 switches the switch signals SW1-SW3 to the disabled voltage level to turn off the switches 121-123.

It should be noted that the execution order of the various steps in FIG. 4 is only an example, and is not intended to limit the present disclosure. The other execution order of the various steps is within the scope of the present disclosure. For example, in some embodiments, steps 420 and 430 of the display stage may be performed simultaneously or in a reverse execution order. In other embodiments, steps 440 and 450 of the touch stage may be performed simultaneously or in a reverse execution order.

The signal control method 400, controller chip 110 and touch screen 100 disclosed in present disclosure can reduce the uneven brightness of the screen caused by the coupling between the dummy lines and their corresponding data lines by adjusting the timing relationship of the switching signals SW1-SW3 transmitted to the switches 121-123.

Certain terms are used in the description and claim to refer to particular elements. However, it should be understood by those skilled in the art that the same elements may be referred to by different terms. The description and the claims do not take the difference in name as a way of distinguishing elements, but take the difference in function of the elements as a basis for distinguishing. The term "comprising" mentioned in the description and the claims is an open-ended term, so it should be interpreted as "including but not limited to". In addition, the term "coupled" herein includes any direct and indirect means of connection. Therefore, if it is described in the description and the claims that the first element is coupled to the second element, it means that the first element may be directly connected to the second element through electrical connection or signal connection such as wireless transmission or optical transmission, or through other elements or connections.

As used herein, the term "and/or" includes any combination of one or more of the mentioned elements. Unless otherwise specified in the description, any term in the singular also includes the meaning in the plural.

The above are preferred embodiments of the present disclosure, and various modifications and equivalent changes may be made to the structure of the present disclosure without departing from the scope or spirit of the present disclosure. In view of the foregoing, it is intended that the present disclosure cover modifications and variations of this invention provided they fall within the scope of the following claims.

What is claimed is:

1. A signal control method, suitable for a touch screen, wherein the touch screen comprises a plurality of scan lines, a plurality of data lines, a demultiplexer, a controller chip and a plurality of dummy lines, the plurality of dummy lines are located above the plurality of data lines, the demultiplexer comprises a plurality of switches coupled to the plurality of data lines, and the signal control method comprises:

switching, by the controller chip, the plurality of scan lines to an enabled voltage level sequentially in a display stage;

turning on, by the controller chip, the plurality of switches sequentially to transmit a plurality of display data to the plurality of data lines when a first scan line of the plurality of scan lines is in the enabled voltage level in the display stage, wherein a first switch of the plurality of switches is coupled to a first data line of the plurality of data lines, and the first data line corresponds to one of the plurality of dummy lines in a vertical direction, when the first scan line is in the enabled voltage level, the first switch is turned on after others of the plurality of switches are turned on, and the period that the first switch being turned on in the display stage is greater than the period that the others of the plurality of switches being turned on in the display stage; and setting, by the controller chip, the plurality of dummy lines to a touch voltage in a touch stage.

2. The signal control method of claim 1, wherein the first switch is turned off after the first scan line is switched to a disabled voltage level and before a second scan line of the plurality of scan lines is switched to the enabled voltage level, wherein the second scan line is adjacent to the first scan line.

3. The signal control method of claim 1, wherein the touch screen comprises a plurality of pixel circuits, and the signal control method further comprises:

transmitting, by the controller chip, a common voltage to the plurality of dummy lines in the display stage, wherein the common voltage and the plurality of display data are configured to control the brightness of the plurality of pixel circuits.

4. The signal control method of claim 1, further comprising:

turning off, by the controller chip, the plurality of switches in the touch stage.

5. A controller chip, configured to be arranged in a touch screen comprising a plurality of scan lines, a plurality of data lines, a demultiplexer and a plurality of dummy lines, wherein the plurality of dummy lines are located above the plurality of data lines, the demultiplexer comprises a plurality of switches coupled to the plurality of data lines, and the controller chip is configured to:

switch the plurality of scan lines to an enabled voltage level sequentially in a display stage;

turn on the plurality of switches sequentially to transmit a plurality of display data to the plurality of data lines when a first scan line of the plurality of scan lines is in the enabled voltage level, wherein a first switch of the plurality of switches is coupled to a first data line of the plurality of data lines, the first data line corresponds to one of the plurality of dummy lines in a vertical direction, when the first scan line is in the enabled voltage level, the first switch is turned on after others of the plurality of switches are turned on, and the period that the first switch being turned on in the display stage is greater than the period that the others of the plurality of switches being turned on in the display stage; and set the plurality of dummy lines to a touch voltage in a touch stage.

6. The controller chip of claim 5, wherein the first switch is turned off after the first scan line is switched to a disabled voltage level and before a second scan line of the plurality of scan lines is switched to the enabled voltage level, wherein the second scan line is adjacent to the first scan line.

7. The controller chip of claim 5, wherein the touch screen comprises a plurality of pixel circuits, and the controller chip is further configured to:

transmit a common voltage to the plurality of dummy lines in the display stage, wherein the common voltage and the plurality of display data are configured to control the brightness of the plurality of pixel circuits.

8. The controller chip of claim 5, wherein the controller chip is further configured to:

turn off the plurality of switches in the touch stage.

9. A touch screen, comprising:

a plurality of scan lines;

a demultiplexer, comprising a plurality of switches;

a plurality of data lines, coupled to the plurality of switches, wherein a first switch of the plurality of switches is coupled to a first data line of the plurality of data lines;

a plurality of dummy lines, located above the plurality of data lines, wherein the first data line corresponds to one of the plurality of dummy lines in a vertical direction; and a controller chip, coupled to the plurality of scan lines, the demultiplexer and the plurality of dummy lines, and configured to:

switch the plurality of scan lines to an enabled voltage level sequentially in a display stage;

turn on the plurality of switches sequentially to transmit a plurality of display data to the plurality of data lines when a first scan line of the plurality of scan lines is in the enabled voltage level, wherein when the first scan line is in the enabled voltage level, the first switch is turned on after others of the plurality of switches are turned on, and the period that the first switch being turned on in the display stage is greater than the period that the others of the plurality of switches being turned on in the display stage; and set the plurality of dummy lines to a touch voltage in a touch stage.

10. The touch screen of claim 9, further comprising:

a plurality of pixel circuits, arranged into a plurality of pixel rows coupled to the plurality of scan lines, and arranged into a plurality of pixel columns coupled to the plurality of data lines, wherein the one of the plurality of dummy lines and the first data line are located between adjacent two of the plurality of pixel columns.

11. The touch screen of claim 10, wherein the controller chip is further configured to transmit a common voltage to the plurality of dummy lines in the display stage, wherein the common voltage and the plurality of display data are configured to control the brightness of the plurality of pixel circuits.

12. The touch screen of claim 9, wherein the first switch is turned off after the first scan line is switched to a disabled voltage level and before a second scan line of the plurality of scan lines is switched to the enabled voltage level, wherein the second scan line is adjacent to the first scan line.

13. The touch screen of claim 9, further comprising a plurality of touch electrodes, wherein the plurality of touch electrodes are arranged in a plurality of touch electrode columns, and the plurality of touch electrode columns and the plurality of dummy lines are arranged alternately.

14. The touch screen of claim 9, wherein a plurality of first ends of the plurality of dummy lines are coupled to each other, and a plurality of second ends of the plurality of dummy lines are respectively coupled to a plurality of pins of the controller chip.

15. The touch screen of claim 9, wherein a plurality of first ends of the plurality of dummy lines are coupled to each other, a plurality of second ends of the plurality of dummy lines are coupled to a node, and the node is coupled to the controller chip.

16. The touch screen of claim 9, wherein the controller chip is further configured to turn off the plurality of switches in the touch stage.

* * * * *